US012573839B2

(12) United States Patent
Khan et al.

(10) Patent No.: US 12,573,839 B2
(45) Date of Patent: Mar. 10, 2026

(54) DISTRIBUTED MAIN-TIE-TIE-MAIN TRANSFER CONTROL SCHEME

(71) Applicant: Google LLC, Mountain View, CA (US)

(72) Inventors: Hammad Ahmad Khan, Leesburg, VA (US); Kei Hao, Anaheim, CA (US); Krishnanjan Gubba Ravikumar, Ashburn, VA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 18/397,246

(22) Filed: Dec. 27, 2023

(65) Prior Publication Data

US 2025/0112455 A1      Apr. 3, 2025

Related U.S. Application Data

(60) Provisional application No. 63/541,474, filed on Sep. 29, 2023.

(51) Int. Cl.
*H02H 7/22*          (2006.01)
*H02H 1/00*          (2006.01)

(52) U.S. Cl.
CPC ............ *H02H 7/22* (2013.01); *H02H 1/0007* (2013.01)

(58) Field of Classification Search
CPC ........ H01H 1/0007; H01H 3/063; H02H 7/22; H02H 7/30; H02J 3/0073; H02J 13/00002; H02J 13/00004; H02J 13/00016; H02J 13/00028; H02J 13/00036; H02J 13/0004
USPC .......................................................... 361/86
See application file for complete search history.

(56) References Cited

U.S. PATENT DOCUMENTS

| | | | | |
|---|---|---|---|---|
| 6,008,971 | A | * | 12/1999 | Duba ........................ H02H 7/30 |
| | | | | 361/64 |
| 9,733,659 | B2 | | 8/2017 | Yang et al. |
| 9,748,797 | B2 | | 8/2017 | Steinert et al. |
| 10,838,476 | B2 | | 11/2020 | Handy et al. |
| 11,112,815 | B1 | | 9/2021 | Wade et al. |

(Continued)

FOREIGN PATENT DOCUMENTS

| | | | |
|---|---|---|---|
| CN | 106230121 B | 7/2018 | |
| EP | 3509180 A1 | 7/2019 | |
| WO | WO-2021000462 A1 * | 1/2021 | ................ H02J 9/06 |

OTHER PUBLICATIONS

Machine translation of Ju et al. International Patent Document WO 2021/000462 A1 Jan. 2021 (Year: 2021).*

(Continued)

*Primary Examiner* — Kevin J Comber
(74) *Attorney, Agent, or Firm* — Lerner David LLP

(57) ABSTRACT

The technology is directed to a main-tie-tie-main (MTTM) power system. The MTTM system may include a first main protection relay controlling a first utility breaker and a second main protection relay controlling a second utility breaker. The MTTM system may further include a first tie protection relay controlling a first tie breaker and a second tie protection relay controlling a second tie breaker. The MTTM system may also include a common bus communicatively connecting the first main protection relay, second main protection relay, first tie protection relay, and second tie protection relay together. Each of the first main protection relay, second main protection relay, first tie protection relay, and second tie protection relay is connected to the common bus via one or more communication lines.

11 Claims, 13 Drawing Sheets

(56) References Cited

U.S. PATENT DOCUMENTS

| | | | |
|---|---|---|---|
| 11,394,201 B2 | 7/2022 | Delago et al. | |
| 2007/0005193 A1 | 1/2007 | Nelson et al. | |
| 2009/0295231 A1 | 12/2009 | Gaffney et al. | |
| 2010/0231042 A1 | 9/2010 | Weale | |
| 2015/0035358 A1* | 2/2015 | Linkhart ............... | H02J 3/0073 |
| | | | 307/64 |
| 2018/0241245 A1 | 8/2018 | Ret et al. | |

OTHER PUBLICATIONS

Extended European Search Report for European Patent Application No. 24202500.5 dated Feb. 17, 2025. 10 pages.

"Fundamentals of Automatic Transfer Switches (ATS)" [online] [Retrieved Dec. 6, 2022] Retrieved from the internet: <https://www.eaton.com/us/en-us/products/low-voltage-power-distribution-control-systems/automatic-transfer-switches/automatic-transfer-switch-fundamentals.html>, 22 pages.

"Automatic Circuit Recloser: Fundamentals" [online]. [Retrieved Dec. 6, 2022] [Retrieved from the internet: <http://<https://www.tavrida.com/tena/solutions/automatic-circuit-reclosers/recloser-fundamentals>, 4 pages.

"Lucy Electric, Sabr Ring Main Unit" [onlin] {Retrieved Dec. 6, 2022] [Retrieved from the internet: <https://lucyelectric-production-assets.s3.eu-west-2.amazonaws.com/2019/04/Sabre-_-3008-2.pdf> 70 pages.

Extended European Search Report for European Patent Application No. 23169840.8 dated Oct. 27, 2023. 7 pages.

* cited by examiner

200

DISTRIBUTED MAIN-TIE-TIE-MAIN TRANSFER CONTROL SCHEME

CROSS-REFERENCE TO RELATED APPLICATION

This application claims the benefit of the filing date of U.S. Provisional Patent Application No. 63/541,474, filed Sep. 29, 2023, the disclosure of which is hereby incorporated herein by reference.

BACKGROUND

A main-tie-tie-main (MTTM) power distribution system is a power system architecture capable of distributing power to loads from two different power sources. By distributing power from two different power sources, a MTTM power distribution system offers redundancy to loads. In this regard, if one power source is unavailable, power from the other power source may be provided to the loads.

Typically, a MTTM power distribution system includes two main protection relays, which constitute the "mains" of the MTTM, and two tie protection relays which constitute the "ties" of the MTTM. The components of an MTTM power distribution system are typically controlled by a central controller. However, integrating a central controller into an MTTM power distribution system introduces single point of failures. In this regard, each breaker and/or relay of the MTTM power distribution system must be routed to the central controller, with each connection presenting a possible failure point. Moreover, MTTM schemes having a central controller typically require that all control and monitoring signals be routed to the central controller, which drives complexity in terms of signal exchange. Further, if the central controller fails, the entire MTTM power system may cease operation, leading to loss of power to connected loads in the event of the loss of a single power source.

To address single point of failure concerns and to improve the reliability of MTTM transfer schemes, some power distribution systems add a backup central controller. However, adding a backup central controller adds costs and complexity, in particular complexity to signal exchange.

BRIEF SUMMARY

The present disclosure generally relates to systems and methods for decentralized transfer control of Main-Tie-Tie-Main power distribution systems. Control of the MTTM power distribution system may be performed by a decentralized transfer control system which can be incorporated into protection relays or other devices as a means of controlling intelligent electronic devices in contrast to intelligent electronic devices having a central controller. In this regard, the protection relays of the MTTM power distribution system may take independent actions, such as opening and closing breakers, based on a shared common bus signal to control the operation of the MTTM power distribution system.

By implementing a decentralized transfer control system including the protection relays instead of a central controller, single point of failures are addressed. Additionally, the complexity of signal exchange relative to a centralized control scheme is reduced, as not all breakers and relays need to be routed to a central controller. Moreover, and as further described herein, the decentralized transfer control system may restore power to loads automatically when a single power source is lost, such as by opening and closing breakers. The decentralized transfer control system may also reconfigure the MTTM power distribution system to the pre-power source failure status to restore power automatically by opening and closing breakers when a lost power source resumes providing power. Further, the decentralized transfer control system may reconfigure the MTTM power distribution system and, in some instances, restore power automatically under abnormal conditions such as breaker failures, operation failures (fail to open/close breakers), and relay failures. In addition, the transfer control system may determine not to take any actions when taking an action that would not result in restoration of power to the loads, such as when both power sources cease providing power, as described herein.

One aspect of the technology is directed to a main-tie-tie-main (MTTM) power system comprising: a first main protection relay controlling a first utility breaker; a second main protection relay controlling a second utility breaker; a first tie protection relay controlling a first tie breaker; a second tie protection relay controlling a second tie breaker; and a common bus communicatively connecting the first main protection relay, second main protection relay, first tie protection relay, and second tie protection relay together, wherein each of the first main protection relay, second main protection relay, first tie protection relay, and second tie protection relay is connected to the common bus via one or more communication lines.

In some instances, the first utility breaker is connected to a first power source and the second utility breaker is connected to a second power source.

In some instances, the first utility breaker is further connected to a first bus and the second utility breaker is further connected to a second bus.

In some instances, the first tie protection relay is connected to the first tie breaker and a first voltage sensing device monitoring a voltage of the first bus, and the second tie protection relay is connected to the second tie breaker and a second voltage sensing device monitoring a voltage of the second bus.

In some instances, a connection line connects the first bus and the second bus.

In some instances, the power system of further comprises a first voltage sensor configured to detect a voltage provided by the first power source to the first utility breaker; a second voltage sensor configured to detect a voltage provided by the second power source to the second utility breaker; a third voltage sensor configured to detect a voltage on the first bus; and a fourth voltage sensor configured to detect a voltage on the second bus.

In some instances, the first voltage sensor is configured to provide the detected voltage provided by the first power source to the first main protection relay, the second voltage sensor is configured to provide the detected voltage provided by the second power source to the second main protection relay, the third voltage sensor is configured to provide the detected voltage on the first bus to the first tie protection relay, and the fourth voltage sensor is configured to provide the voltage detected on the second bus to the second tie protection relay.

In some instances, one or more loads are connected to the first and/or second bus.

In some instances, the first main protection relay and the first tie protection form a first relay pair and the second main protection relay and the second tie protection relay form a second relay pair.

In some instances, the first main protection relay and the first tie protection relay are connected together via a first paired line and the second main protection relay and the second tie protection relay are connected together via a second paired line.

In some instances, the first main protection relay is configured to control the first utility breaker, the second main protection relay is configured to control the second utility breaker, the first tie protection relay is configured to control the first tie breaker, and the second tie protection relay is configured to control the second tie breaker.

In some instances, the first main protection relay may control the first tie breaker via the first paired line and the first tie protection relay may control first utility breaker via the first paired line.

In some instances, the second main protection relay may control the second tie breaker via the second paired line and the second tie protection relay may control the second utility breaker via the second paired line.

DETAILED DESCRIPTION

Generally disclosed herein are decentralized transfer control systems and corresponding logic capable of transfer control of Main-Tie-Tie-Main power distribution system architectures. The transfer control systems may control the operation of breakers operated by the main and tie relays to restore power automatically to loads when a loss of power occurs. Additionally, the transfer control systems may control the operation of breakers operated by the main and tie relays when a preferred source selection is made. The transfer control system may maintain at least one open breaker to avoid paralleling two or more independent power sources under normal operation.

Figure 1:
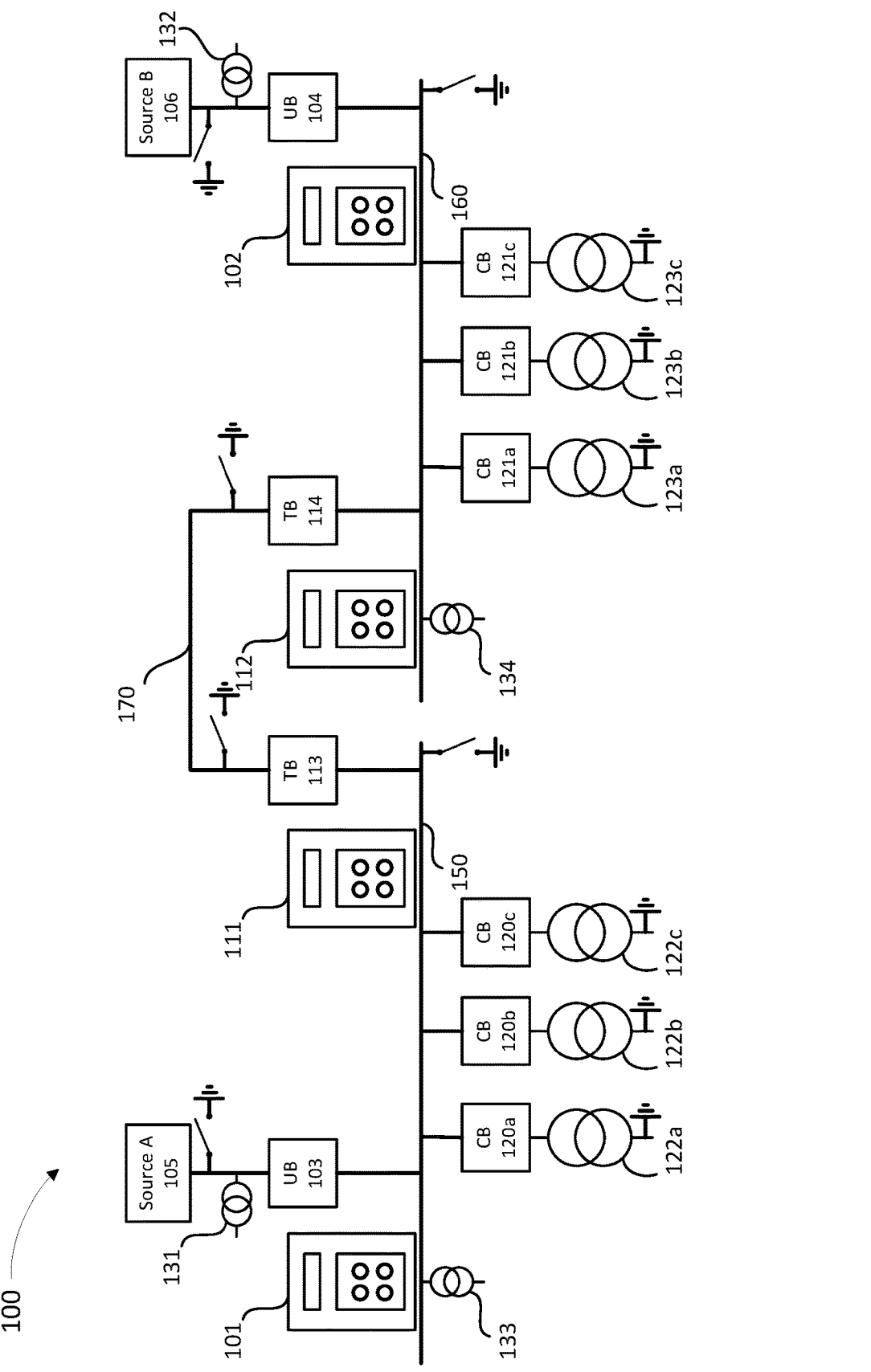
FIG. 1 is a block diagram of an example Main-Tie-Tie-Main power distribution system architecture, according to aspects of the disclosure.

FIG. 1 illustrates a main-tie-tie-main (MTTM) power distribution system architecture 100, which may also be referred to herein as a "power system." The power system 100 includes four protection relays, including main 1 protection relay 101, main 2 protection relay 102, tie 1 protection relay 111, and tie 2 protection relay 112. The power system also includes four breakers, including utility breaker (UB) 103, UB 104, tie breaker (TB) 113, and TB 114. The four protection relays, including main 1 protection relay 101, main 2 protection relay 102, tie 1 protection relay 111, and tie 2 protection relay 112 may form a decentralized transfer control system, as detailed herein.

Each relay may control the operation of an associated breaker. In this regard, the main 1 protection relay 101 may control the operation of the utility breaker (UB) 103, main 2 protection relay 102 may control the operation of the UB 104, tie 1 protection relay 111 may control the operation of the tie breaker (TB) 113, and tie 2 protection relay 112 may control the operation of TB 114. Operations of the breakers 103, 104, 113, and 114 may include opening and closing of the breakers, such that power is prevented from or capable of passing through the breakers, respectively.

In addition to main 1 protection relay 101 monitoring its own breaker (UB 103), main 1 protection relay 101 may also share the following signals to and from the associated tie breaker (TB 113): Main Protection Relay Open Command to Tie Breaker, Main Protection Relay Close Command to Tie Breaker, Tie Breaker Open Status to Main Protection Relay, Tie Breaker Close Status to Main Protection Relay. Similar to main 1 protection relay 101, tie 1 protection relay 111 may monitor its own breaker (TB 113) and also share the following signal to and from the associated main breaker (UB 103): Tie Protection Relay Open Command to Main Breaker, Tie Protection Relay Close Command to Main Breaker, Main Breaker Open Status to Tie Protection Relay, and Main Breaker Close Status to Tie Protection Relay. Main 2 protection relay 102 and tie 2 protection relay 112 may have similar operations to those described with regard to main 1 protection relay 101 and tie 1 protection relay 111

As further shown in FIG. 1, the power distribution system architecture 100 includes two buses, including bus 1 150 and bus 2 160. Loads, including loads 122a, 122b, 122c are connected to bus 1 150 via respective circuit breakers 120a, 120b, and 120c. Loads, including loads 123a, 123b, 123c are connected to bus 2 160 via respective circuit breakers 121a, 121b, and 121c. Although FIG. 1 illustrates three loads being connected to each of bus 1 150 and bus 2 160, any number of loads may be connected to each bus. For instance, one load may be connected to bus 1 150, and ten loads may be connected to bus 2 160. For clarity and consistency, the term "breaker(s)," as used herein, will be understood to refer to either a circuit breaker (including utility and tie breakers) or a disconnector unless otherwise specified.

Each utility breaker 103, 104 may be connected to a power source. For instance, and as shown in FIG. 1, UB 103 is connected to source A 105 and UB 104 is connected to source B 106. In this regard, UB 103 may control whether power delivered from source A 105 is provided to bus 1 150 and UB 104 may control whether power delivered from source B 106 is provided to bus 2 160. For instance, if UB 103 is open, power from source A 105 may not pass to bus 1 150. However, when UB 103 is closed, power from source A 105 may be provided to bus 1 150.

Tie breakers 113, 114 may control power delivery between buses. In this regard, TBs 113, 114 are connected via a power cable represented by connection line 170. Although connection line 170 is illustrated as a power cable, an electrical bus can be utilized instead. In operation, when power is delivered to bus 1 150 by source A 150 and TB 113 is closed, the power delivered to bus 1 150 may pass through TB 113, over connection line 170, to TB 114. In the event TB 114 is closed, the power delivered to bus 1 150 by source A 105 may be delivered to bus 2 160. In the event TB 114 is open, the power delivered to bus 1 150 by source A 105 may be prevented from passing to bus 2 160. Alternatively, TB 113 may be open and power delivered to bus 1 150 from source A 105 may be prevented from passing to connection line 170. Similarly, when power is delivered to bus 2 160 by source B 106 and TB 114 is closed, the power delivered to bus 2 160 may pass through TB 114, over connection line 170, to TB 113. In the event TB 113 is closed, the power delivered to bus 2 160 by source B 106 may be delivered to bus 1 150. In the event TB 113 is open, the power delivered to bus 2 160 by source B 106 may be prevented from passing to bus 1 150. Alternatively, TB 114 may be open and power delivered to bus 2 160 from source B 106 may be prevented from passing to connection line 170.

Power distribution system architecture 100 may further include sensors to detect the presence or absence of voltage on a line and/or bus. For instance, and as further shown in FIG. 1, voltage sensor 131 may detect voltage on the line connecting source A 105 and UB 103 and voltage sensor 132 may detect voltage on the line connecting source B 106 and UB 104. Voltage sensors 133 and 134 may detect voltage (or the lack thereof) on buses 150 and 160, respectively. Voltage sensor 131 may be connected to, or otherwise in communication with main 1 protection relay 101 and voltage sensor 132 may be connected to, or otherwise in communication with main 2 protection relay 102. Similarly, voltage sensors 133 and 134 may be connected to, or otherwise in communications with tie 1 protection relay 111 and tie 2 protection relay 112, respectively. Voltage sensors may include voltage transformer, low power voltage transformer, live line detector, or any other sensor type that detects voltage. Although FIG. 1 illustrates voltage sensors, other sensors, such as current sensors may be used instead of, or in addition to, voltage sensors.

Although the sensors, breakers, and protection relays are shown as separate components, it will be understood that the components may be implemented in a single unit. For instance, main 1 protection relay 101 may include UB 103 and sensor 131. In another example, tie 2 protection relay 112 may include TB 114 and sensor 134.

During operation, bus 1 150 may provide power to loads 122*a*-122*c* and bus 2 160 may provide power to loads 123*a*-123*c*. In this regard, bus 1 150 may provide voltage received from a power source—either power source A 105 or source B 106—to loads 122*a*-122*c* via CBs 123*a*-120*c*. However, in instances where a CB is open or no power is on the bus, no power may be received by the load(s). For instance, if CB 120*b* is open, load 122*b* will not receive power.

The line and bus layouts of the power system architecture 100 are but one example of a potential layout of line and bus layouts in a power system architecture. In this regard, the power system architecture may include any number of lines and buses, including intermediary buses and lines. For instance, the line connecting power source A 105 to UB 103 may include any number of intermediary lines such that power delivered from power source A traverses more than a single line before reaching UB 103. In another example, although bus 1 150 is illustrated as a single bus, bus 1 150 may comprise two or more buses.

Figure 2:
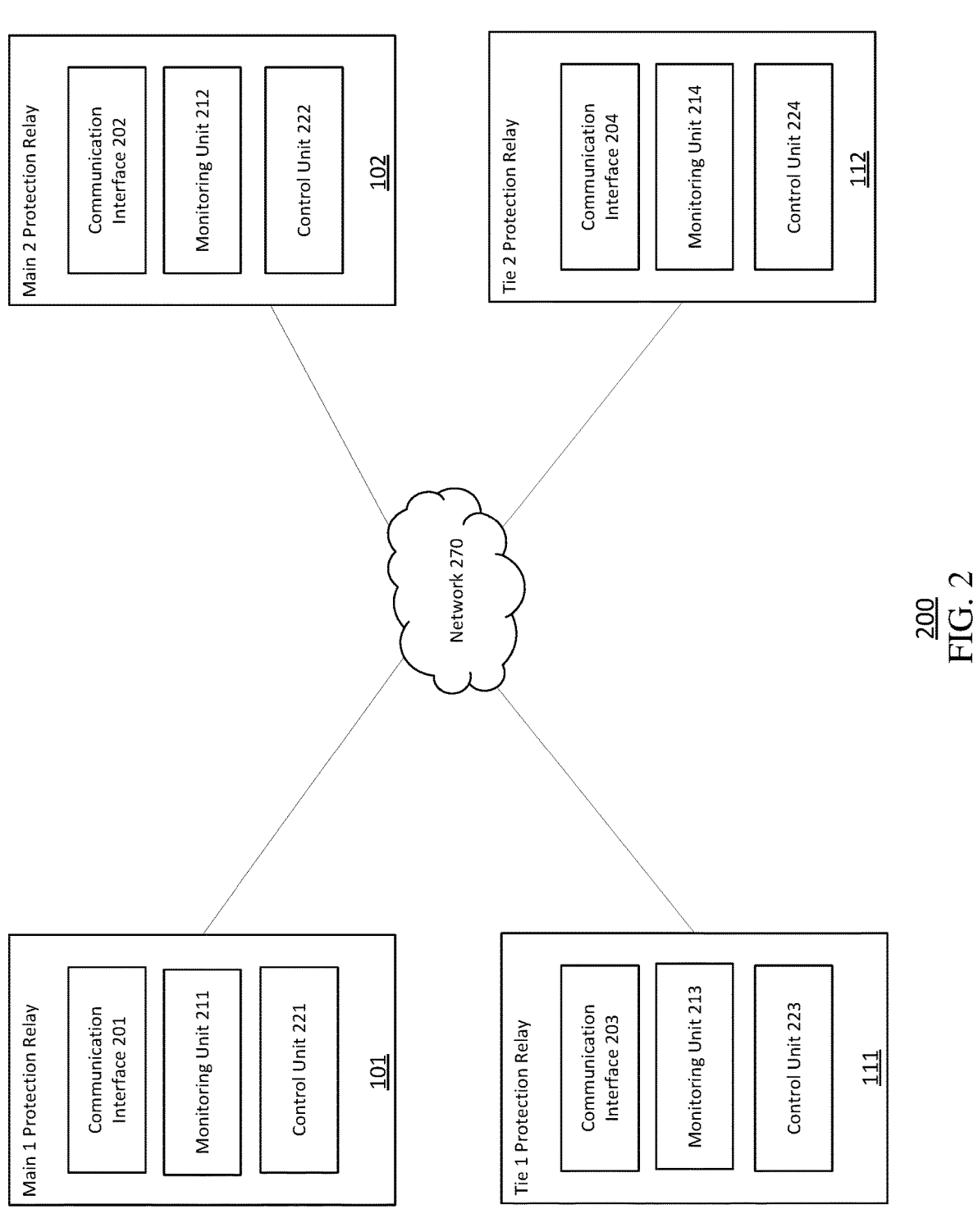
FIG. 2 is a block diagram of an example network system for communication between protection relays of a decentralized transfer control system according to aspects of the disclosure.

FIG. 2 depicts a block diagram of an example network system 200 for communication between feeder unit controllers. In this example, main 1 protection relay 101, main 2 protection relay 102, tie 1 protection relay 111, and tie 2 protection relay 112 include respective communication interfaces 201, 202, 203, 204, monitoring units 211, 212, 213, 214, and control units 221, 222, 223, 224.

The communication interfaces 201, 202, 203, 204 may be capable of direct and indirect communication with one another over network 270. The network 270 may include various configurations and protocols, including the Internet, World Wide Web, intranets, virtual private networks, wide area networks, local networks, private networks using communication protocols, point-to-point communications, or international standard defining communication protocols, hard-wired, Ethernet, WiFi, and RPC, HTTP, and various combination of the foregoing.

The control units 221, 222, 223, 224 may contain one or more processors, memory, and other components typically present in computing devices. The memory can store information accessible by the processors including instructions that can be executed by the processor, such as controlling the operation of one or more breakers. Memory can include data that can be retrieved, manipulated, or stored by the processor. The memory may be a type of non-transitory computer-readable medium capable of storing information accessible by the processor, such as a hard-drive, solid state drive, tape drive, optical storage, memory card, ROM, RAM, DVD, CD-ROM, write-cable, and read-only memory.

Monitoring units 211, 212, 213, 214 may monitor the voltage (or current) on a bus or power line to detect power and/or the loss of power. For instance, monitoring units 211, 212, 213, 214 may monitor voltage sensors, such as voltage sensors 131, 132, 133, and/or 134 to detect the presence (or lack thereof) of voltage on the line or bus to which the respective sensor is attached. In some instances, the sensors may provide information related to the voltage being detected by the sensors, such as the voltage value, frequency of the power signal, phase of the power signal, etc.

For example, monitoring unit 211 may be connected, wireless and/or with a wired connection, to voltage sensor 131. Monitoring unit 211 may monitor a signal(s) provided by voltage sensor 131 indicating the presence of voltage (or lack thereof) on the line connecting source A 105 to UB 103. In another example, monitoring unit 212 may monitor a signal(s) provided by voltage sensor 132 indicating the presence of a voltage (or lack thereof) on the line connecting source B 106 to UB 104.

The monitoring units of the tie protection relays, including monitoring unit 213 of tie 1 protection relay 111 and monitoring unit 214 of tie 2 protection relay 112 may operate similarly to the monitoring units of the main protection relays. For instance, monitoring unit 213 may monitor a signal(s) provided by voltage sensor 133 indicating the presence of voltage (or lack thereof) on the bus 1 150. Similarly, monitoring unit 214 may monitor a signal(s) provided by voltage sensor 13 indicating the presence of voltage (or lack thereof) on the bus 2 160. In some instances, the sensors may provide information related to the voltage being detected by the sensors, such as the voltage value, frequency of the power signal, phase of the power signal, etc. Information collected by a monitoring unit of a relay may be provided to the respective relay's control unit. Although the communication interfaces, monitoring units, and control units, are illustrated as separate components, the interfaces and units can be combined in a singular component. For instance, communication interface 201, monitoring unit 211, and control unit 221 may be implemented as a single component.

Although the communication interfaces, monitoring units, and control units, are shown as being integrated into protection relays, such components can be, additionally or alternatively, implemented by other intelligent electronic devices (IEDs). In such instances, the decentralized transfer control systems described herein can be implemented by the IEDs in addition to, or alternatively from, the protection relays.

Figure 3:
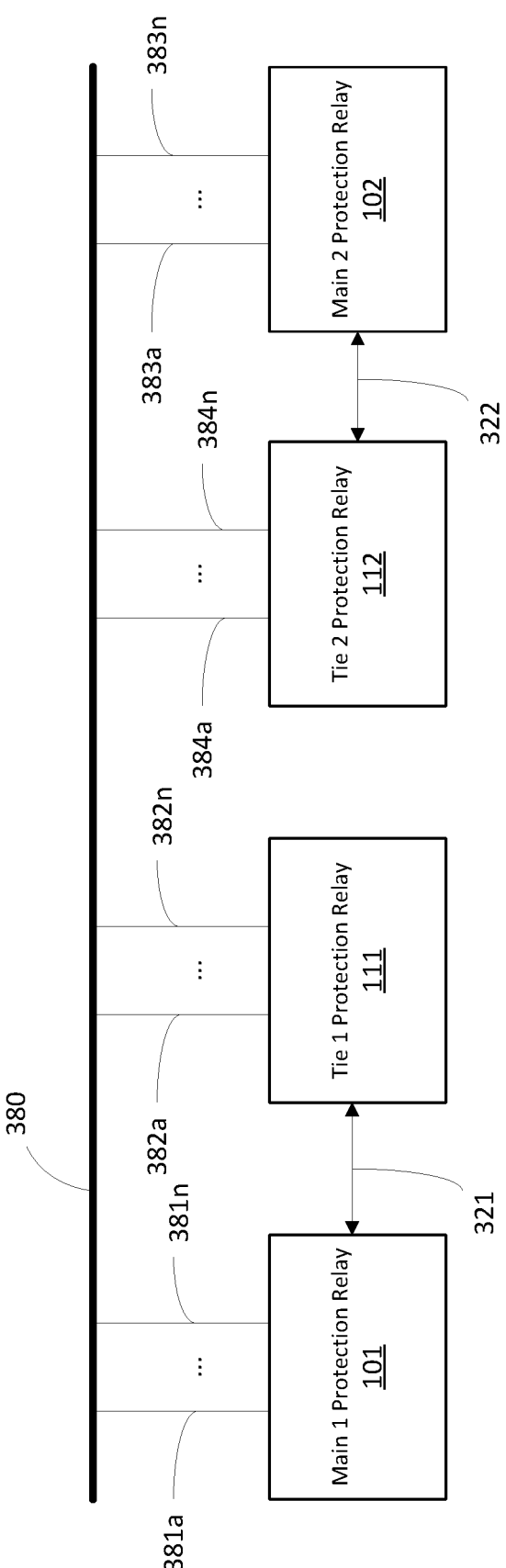
FIG. 3 is a block diagram of an example hard-wired communication interface between protection relays of a decentralized transfer control system according to aspects of the disclosure.

FIG. 3 is a block diagram illustrating an example hard-wired connection between relays, including main 1 protection relay 101, main 2 protection relay 102, tie 1 protection relay 111, and tie 2 protection relay 112 via communication lines 381-384 and a common bus 380. Common bus 380 may relay information, referred to herein as "shared signals" from one relay to another relay of the transfer control system. Shared signals, described further herein, may include, Open Point At Bus 1, Open Point at Bus 2, Voltage Common Bus High, Open Point Ready to Close, Open Point Failed to Close, Transfer in Progress, Preferred Source A, and/or Preferred Source B. Although common bus 380 is illustrated as a hard-wired connection between relays, common bus 380 may include various configurations and protocols. For instance, common bus 380 may be a connection between communication interfaces 201, 202, 203, 204 over network 270.

As illustrated in FIG. 3, each relay may have between "1" and "n" communication lines, where "n" is dependent on the number of shared signals being sent and received by a relay. In this regard, each relay may include separate communication lines for each shared signal, with some shared signals having separate communication lines for shared signal reception and transmission. For instance, main 1 protection relay 101 may have communication lines for communicating whether UB 103 has an Open Point, receiving (or providing) a shared signal indicating whether a Transfer in Progress signal is on the common bus 380, and receiving (or providing) a shared signal indicating an Open Point Failed to Close, etc. The control units 221-223 of the protection relays 101, 102, 111, 112 may continuously monitor the signals on the common bus 380, as received via respective communication interfaces 201-204.

The shared signal "Open Point at Bus 1" may be a signal provided to the common bus 380 by main 1 protection relay 101 and/or tie 1 protection relay 111 indicating that bus 1 150 has at least one open point. An open point may correspond to an open breaker. In this regard, the open point related to Open Point at Bus 1 may be UB 103 and/or TB 113.

The shared signal "Open Point at Bus 2" may be a signal provided to the common bus 380 by main 2 protection relay 102 and/or tie 2 protection relay 112 indicating that bus 2 160 has at least one open point. In this regard, the open point related to Open Point at Bus 2 may be UB 104 and/or TB 114.

The shared signal "Voltage Common Bus High" may be a signal provided to the common bus 380 to indicate at least one of the protection relays involved in the transfer control system senses a healthy voltage, indicating proper power is being provided. In this regard, when a monitoring unit of a protection relay detects a healthy voltage, indicating power, the control unit may output a "Voltage Common Bus High" signal to the common bus 380. For instance, monitoring unit 214 of tie 2 protection relay 112 may detect a healthy voltage on bus 2 160 based on a signal provided by voltage sensor

134. Based upon detecting the voltage, control unit 224 may output a Voltage Common Bus High signal to the common bus 380.

A "Voltage OK" check may be implemented by protection relays prior to transmitting a Voltage Common Bus High shared signal. The Voltage OK check may be user defined test that is a precursor to transmitting a Voltage Common Bus High shared signal. When the sensor associated with a protection relay detects voltage, the controller in that protection relay determines if the voltage is healthy according to a list of user defined criteria. When the healthy voltage criteria is satisfied, that protection relay may transmit a Voltage Common Bus High shared signal. The check for a voltage is to make sure that only a healthy voltage is supplied to the loads.

The list of user defined criteria for the Voltage OK check at the main protection relays 101, 102 may include one or more of the following: Operational values used below are received from voltage sensors, such as voltage sensors 131 and 132, which detect voltage on the line connecting source A 105 and UB 103 and voltage on the line connecting source B 106 and UB 104, respectively; Phase-phase voltage is above 90% of the nominal voltage; Phase-phase voltage is below 110% of the nominal voltage; Frequency is above 99% of the nominal frequency; Frequency is below 101% of the nominal frequency; The MCB in the path from Voltage Transformer to Protection Relay is not tripped. The aforementioned percentages and values provided for the list of user defined criteria for the Voltage OK check at the main protection relays 101, 102, are merely examples and other percentages and values may be used instead. For instance, the user defined criteria may be phase-phase voltage is above 85%.

The list of user defined criteria for the Voltage OK check at the relay protection relays 111, 112 may include one or more of the following: Operational values used below are received from voltage sensors, such as voltage sensors 133 and 134, which detect voltage on bus 1 150 and on bus 2 160, respectively; Phase-phase voltage is above 90% of the nominal voltage; Phase-phase voltage is below 110% of the nominal voltage; Frequency is above 99% of the nominal frequency; Frequency is below 101% of the nominal frequency; and/or The MCB in the path from Voltage Transformer to Protection Relay is not tripped. The aforementioned percentages and values provided for the list of user defined criteria for the Voltage OK check at the main protection relays 101, 102, are merely examples and other percentages and values may be used instead. For instance, the user defined criteria may be frequency above 95%.

The shared signal "Open Point Ready to Close" may be a signal provided to the common bus 380 by a protection relay that controls an open breaker that is capable of closing. Stated another way, the Open Point Ready to Close signal indicates that, when the Open point is ready to close, there are no limitations or faults known by the associated Protection Relay that would prohibit the closing of the Open Point. For instance, TB 113 may be open and capable of being closed. Accordingly, tie 1 protection relay 111, which monitors and controls TB 113, may output an Open Point Ready to Close signal to common bus 380. The Open Point Ready to Close signal may be used by other protection relays to get an open permissive for automatic control mode. The Open Point Ready to Close signal may be used to ensure that the original open point is closed once a new opening is created, as discussed further herein.

The shared signal "Open Point Failed to Close," may be a signal provided to the common bus 380 by a protection relay controlling an Open Point that has attempted to close but failed. In other words, Open Point Failed to Close signal indicates that movement of the Open Point was unsuccessful, thereby providing an indication to any newly created Open Points to close again to maintain voltages on the buses (e.g., bus 1 150 and/or bus 2 160), as described further herein.

The shared signal "Transfer in Progress," may be a signal provided to the common bus 380 by a protection relay indicating a transfer is pending and that the opening/closing of a breaker may occur. The Transfer in Progress signal may be activated by a protective relay when the protective relay is about to trigger the closure of the breaker under its control. For example, main 1 protection relay 102 may be set to close UB 104. Before doing so, main 1 protection relay 102 may send a Transfer in Progress signal to the common bus 380. Main 1 protection relay 102 may then trigger the closure of UB 104. After closure of UB 104 is complete (or closure fails), main 1 protection relay 102 may cease providing the Transfer in Progress signal to the common bus 380.

The shared signals "Preferred Source A" and "Preferred Source B" may be used to indicate which source is selected as the preferred source. The selection of a preferred source may be made via a switch, such as a switch on switchgear of the power distribution system architecture 100 or remotely, such as via a supervisory control and data acquisition (SCADA) system (not shown). For instance, if source A 105 is the preferred source, the "Preferred Source A" signal may be provided on the common bus 380. Alternatively, if source B 106 is the preferred source, the "Preferred Source B" signal may be provided on the common bus 380.

In instances where the selection of the preferred source is made by SCADA, the selection may be provided to the protection relays 101, 102, 111, and 112 via a network, such as network 270. When using SCADA, there may also be a signal referred to herein as "Default Preferred." The Default Preferred signal may instruct the protection relays to return the system back to an original state with either Open Point at Tie 1 Protection Relay or Tie 2 Protection Relay and both utility breakers 103, 104 are closed feeding each respective bus 150, 160.

In instances where the selection of the preferred source is made by a switch, the selection may be provided to the protection relays 101, 102, 111, and 112, and the protection relays may energize the Common Bus 380.

The selection of Preferred Source A or Preferred Source B will result in single-ended operation. For example, if maintenance needs to be done on the line connecting Source B to UB 104, an operator can select Preferred Source A and both Bus 150 and 160 will be fed by Source A.

Each main protection relay may be paired with a tie protection relay to form a relay pair. For instance, main 1 protection relay 101 may be paired with tie 1 protection relay 111 and main 2 protection relay 102 may be paired with tie 2 protection relay 112. Each relay pair may communicate via paired lines. For instance, and as illustrated in FIG. 3, the relay pair that includes main 1 protection relay 101 and tie 1 protection relay 111 may communicate via pair line(s) 321. Similarly, the relay pair that includes main 2 protection relay 102 and tie 2 protection relay 112 may communicate via pair line(s) 322. As described further herein, each relay in a relay pair may control the breaker associated with the other breaker in the relay pair. Although FIG. 3 illustrates pair lines 321 and 322 as separate from other communication channels, such as the common bus 380, the pair lines may be implemented over network 270.

One relay of a relay pair may be designated as the primary relay and the other relay may be designated as the secondary relay. The primary relay may be the relay that first issues commands to open and/or close breakers under the control of the primary and secondary breakers. For instance, main 1 protection relay 101 may be designated as the primary relay and tie 1 protection relay 111 may be designated as the secondary relay. When breakers UB 103 and/or TB 113 are to be opened or closed, the primary relay—main 1 protection relay 101—may send a signal to UB 103 and/or TB 113 to open or close. After a predefined amount of time, if UB 103 and/or TB 113 do not open or close as instructed by main 1 protection relay 101, the secondary relay—tie 1 protection relay 111 may send a signal to UB 103 and/or TB 113 to open or close. Although the above example describes the main protection relay as the primary relay and the tie protection relay as the secondary relay, the roles may be reversed, with the tie protection relay being the primary relay and the main protection relay being the secondary relay.

Signals sent from main 1 protection relay 101 to tie 1 protection relay 111 and from main 2 protection relay 102 to tie 2 protection relay 112 may include a "Main Protection Relay Failure." The Main Protection Relay Failure signal may be sent from a main protection relay to a tie protection relay when the main protection relay fails, using, for example, a communication line such as communication line 321 or 322.

Each main protection relay in a relay pair may monitor and control the breaker associated with the main protection relay along with the breaker of the paired tie protection relay. To do so, the relays of a relay pair may communicate one or more signals over paired lines 321, 322. Such signals may include "Main Protection Relay Open Command to Tie Breaker" and "Main Protection Relay Close Command to Tie Breaker" commands sent from the main protection relay to the tie protection relay and "Tie Breaker Open Status to Main Protection Relay" and "Tie Breaker Close Status to Main Protection Relay" signals sent to the main protection relay from the tie protection relay.

Each tie protection relay in a relay pair may monitor and control the breaker associated with the tie protection relay along with the breaker of the paired main protection relay. To do so, the relays of a relay pair may communicate one or more signals over paired lines. Such signals may include "Tie Protection Relay Open Command to Main Breaker" and "Tie Protection Relay Close Command to Main Breaker" commands sent from the tie protection relay to the main protection relay and "Main Breaker Open Status to Tie Protection Relay" and "Main Breaker Close Status to Tie Protection Relay" signals sent to the tie protection relay from the main protection relay.

Figure 4A:
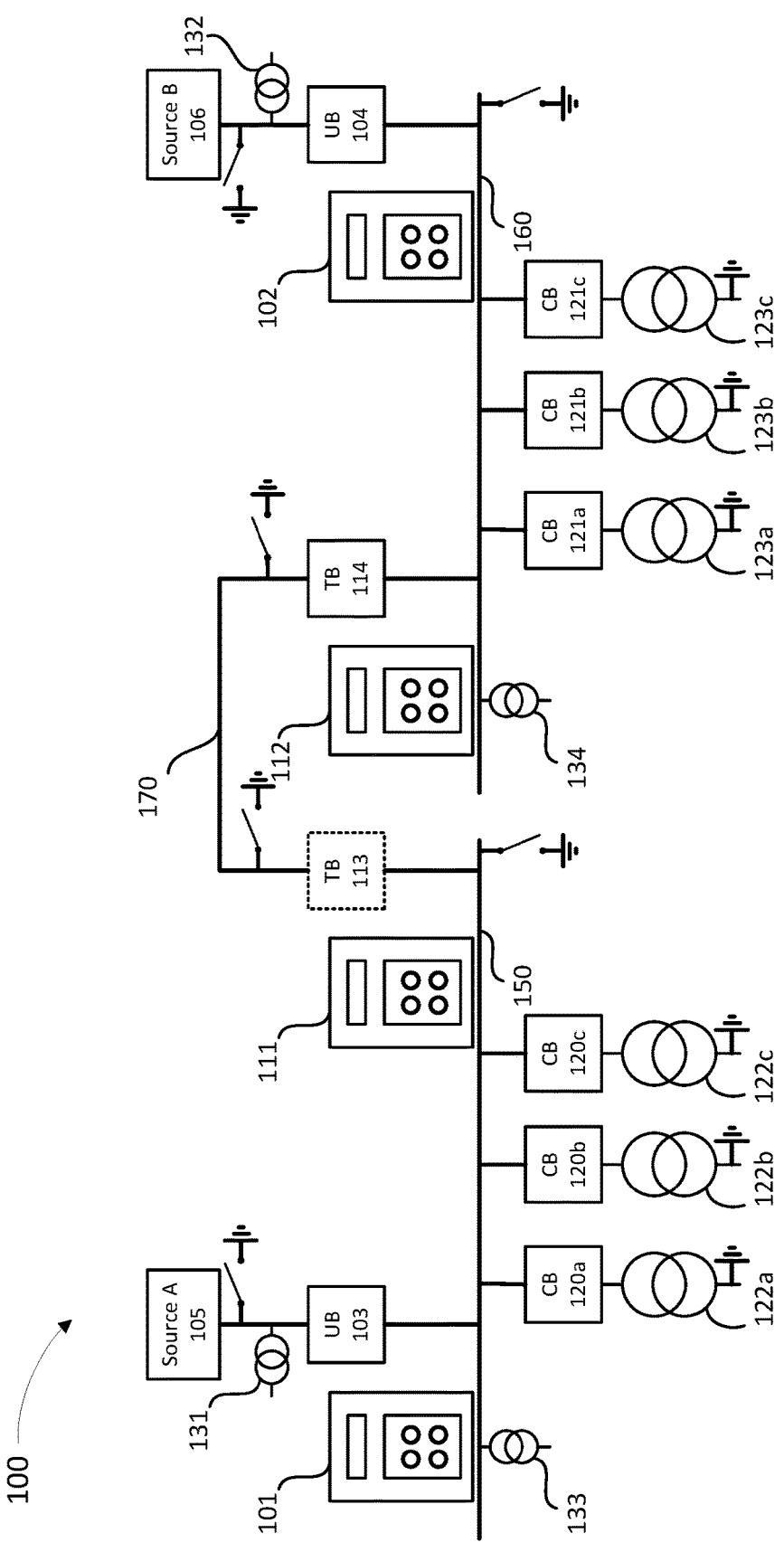
FIG. 4A is an illustrated of an example power system operating in a first typical operating scenario, according to aspects of the disclosure.
Figure 4B:
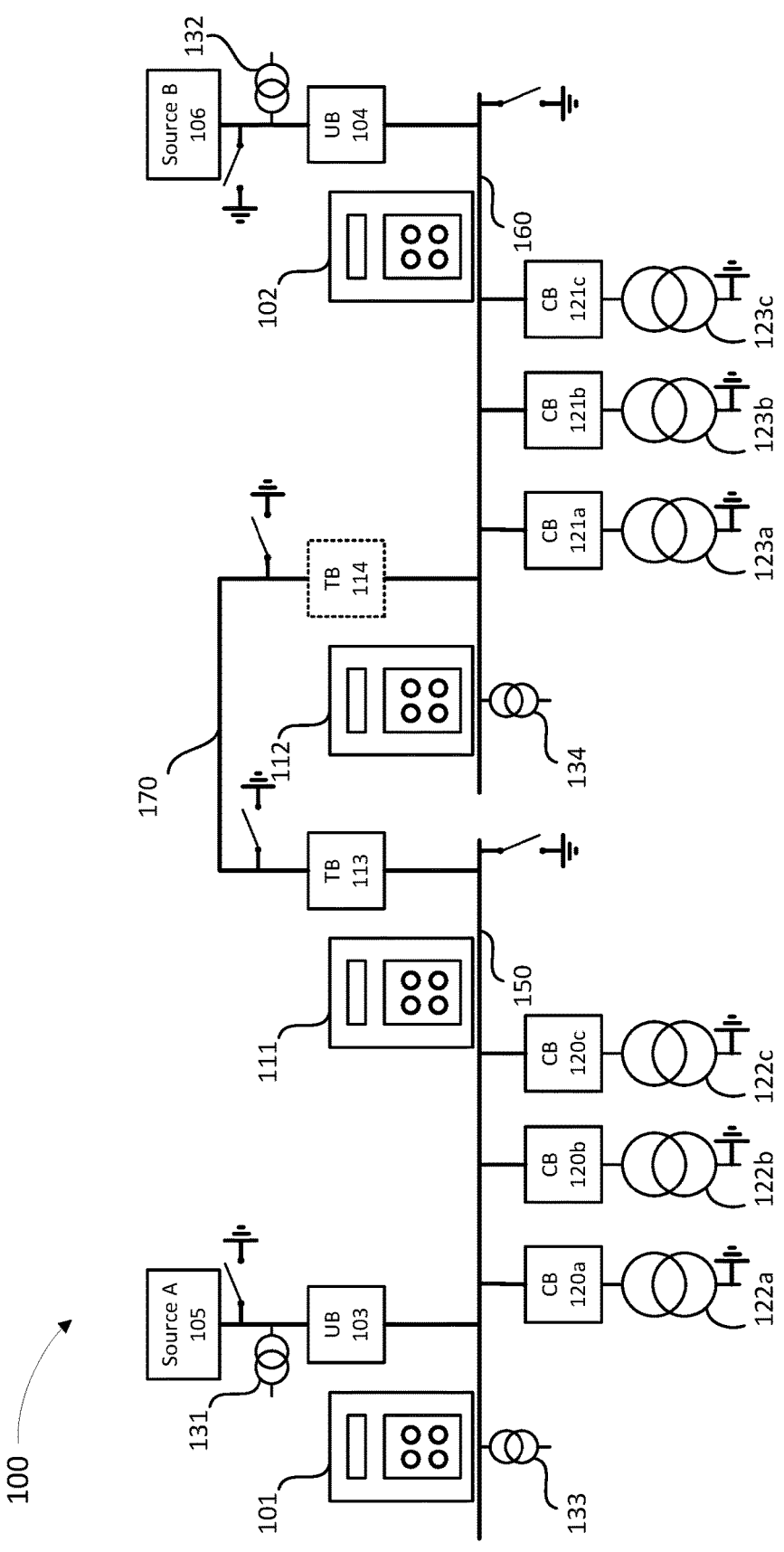
FIG. 4B is an illustrated of an example power system operating in a second typical operating scenario, according to aspects of the disclosure.

FIGS. 4A and 4B depict power system architecture 100 operating in typical operating states. As illustrated, in both FIGS. 4A and 4B, UB 103 and UB 104 are closed, and power is supplied by source A 105 and source B 106. Thus, power from source A powers bus 1 150 and power from source B powers bus 2 160.

FIG. 4A illustrates a first typical operating state where TB 114 is closed and TB 113 is open (illustrated by the dashed box). TB 113 being open prevents power from bus 1 150 from going to bus 2 160 and vice versa. FIG. 4B illustrates a second typical operating state where TB 114 is open (illustrated by the dashed box) and TB 113 is closed. Thus, power from source A powers bus 1 150 and power from source B powers bus 2 160. TB 114 being open prevents power from bus 1 150 from going to bus 2 160 and vice versa.

In the operating state illustrated in FIG. 4A, tie 1 protection relay 111 outputs an Open Point Ready to Close signal to the common bus 380, as its associated breaker, TB 113, is capable of closing. Main 1 protection relay 101 and tie 1 protection relay 111 each output an Open Point at Bus 1 signal to the common bus 380, as the Open Point—TB 113—is on bus 1 150. Main 1 protection relay 101 is informed of the state of TB 113 by tie 1 protection relay 111. In this regard, tie 1 protection relay 111 provides a Tie Breaker Open Status to main 1 protection relay 101 via paired line 321.

In the operating state illustrated in FIG. 4B, tie 2 protection relay 112 outputs an Open Point Ready to Close signal to the common bus 380, as its associated breaker, TB 114, is capable of closing. Main 2 protection relay 102 and tie 2 protection relay 112 each output an Open Point at Bus 2 signal to the common bus 380, as the Open Point—TB 114—is on bus 2 160. Main 2 protection relay 102 is informed of the state of TB 114 by tie 2 protection relay 112. In this regard, tie 2 protection relay 112 provides a Tie Breaker Open Status to main 2 protection relay 102 via paired line 322.

Referring again to both FIGS. 4A and 4B, all relays output a Voltage Common Bus High signal to the common bus 380, as each relay detects a voltage from its corresponding voltage sensor. In this regard, the monitoring units 211, 212 of main 1 protection relay 101 and main 2 protection relay 102 may receive an indication of voltage from voltage sensors 131 and 132, respectively. In this regard, voltage sensor 131 may detect voltage on the line connecting source A 105 and UB 103 and voltage sensor 132 may detect voltage on the line connecting source B 106 and UB 104. These detected voltages may be provided to the monitoring units 211, 212 of the main protection relays.

Similarly, monitoring units 213, 214 of tie 1 protection relay 111 and tie 2 protection relay 112 may receive an indication of voltage from voltage sensors 133 and 134, respectively. In this regard, voltage sensor 133 may detect voltage on bus 1 150 and voltage sensor 132 may detect voltage on bus 2 160. These detected voltages may be provided to the monitoring units 213, 214 of the tie protection relays.

During operation, the transfer control system of power system 100 may perform control checks to ensure the power system 100 is operating as expected. In the event the power system architecture 100 is not operating as expected conditions, transfer control may be performed, as described herein. The control checks may include determining, based on information contained in shared signals, signals sent between paired relays, and/or signals received from voltage sensors are as expected.

Loss of a Single Power Source

Figure 5A:
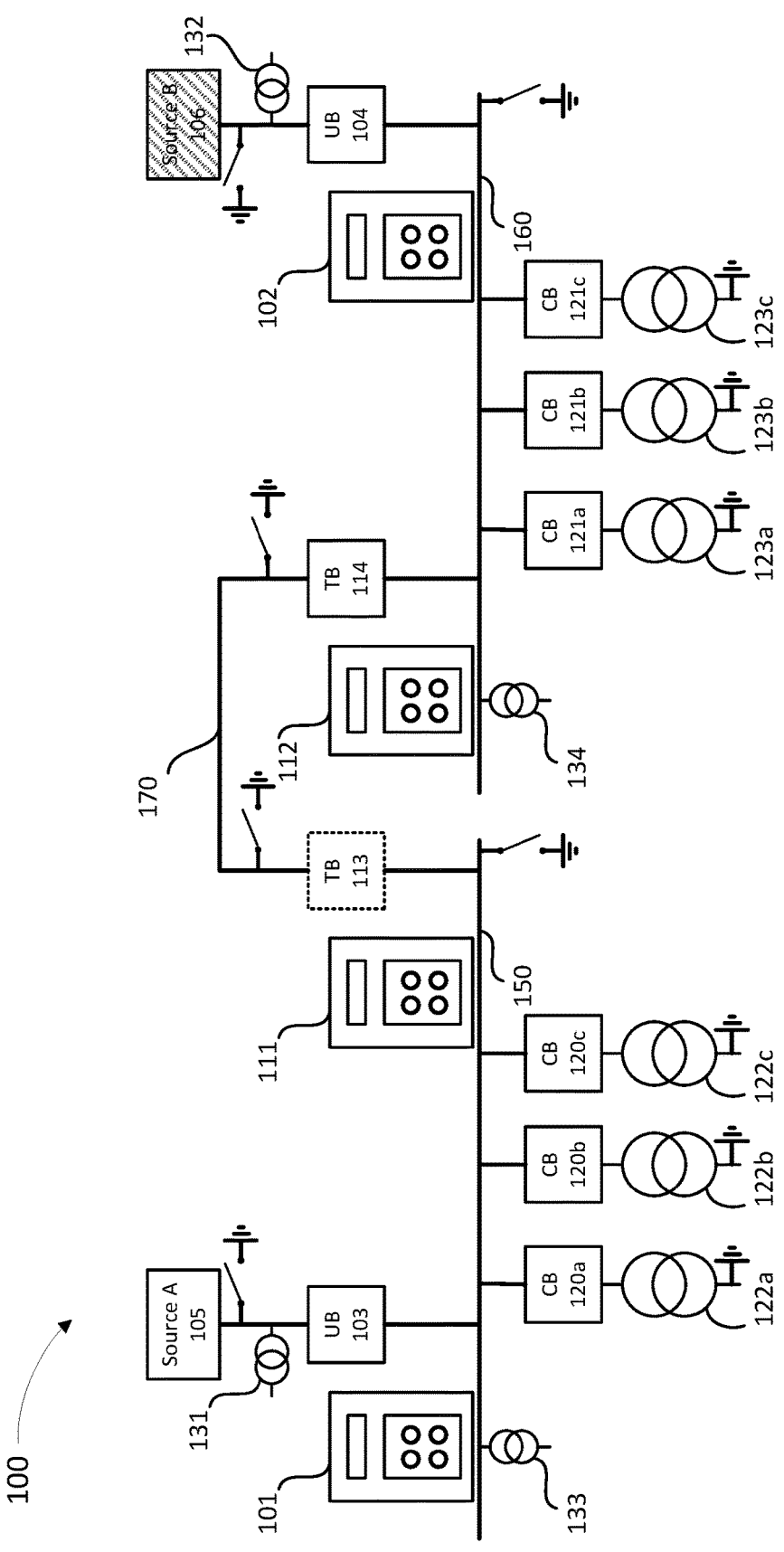
FIGS. 5A and 5B illustrate the operation of a power system, operating in a first typical operating scenario, when a single power source is unavailable, according to aspects of the disclosure.
Figure 5B:
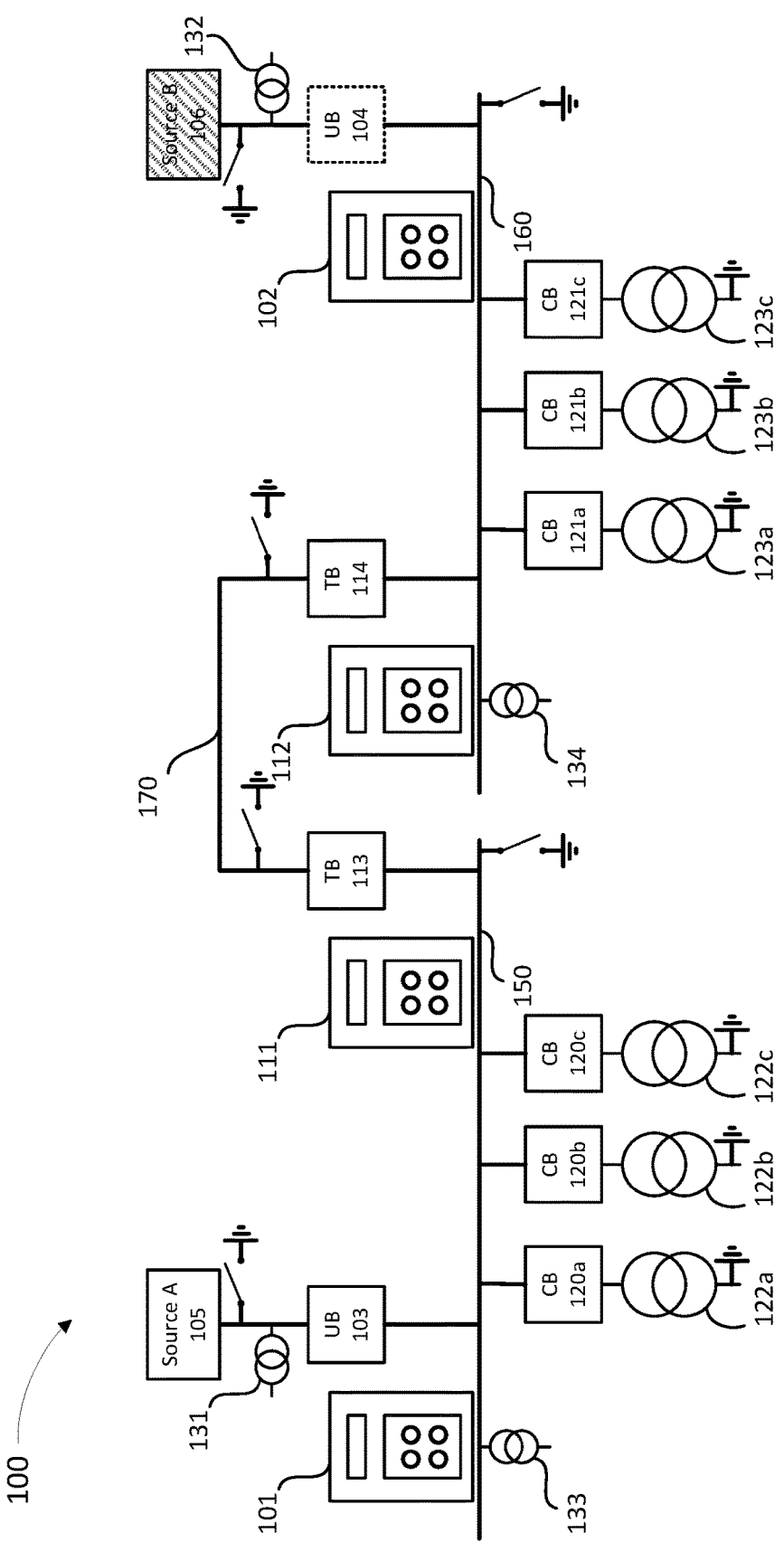

FIGS. 5A and 5B illustrate the operation of power system 100 in a first typical operation state (shown in FIG. 4A), when a single power source becomes unavailable. In the example shown in FIG. 5A, power system architecture 100 loses source B 106, such as by the power source B failing or a disconnection of the power system 100 from source B 106. The loss of source B 106 is illustrated by the shading of source B 106.

The loss of source B 106 results in power no longer being supplied to bus 2 160. This is because TB 113 is open, preventing power from source A 105 from being provided from flowing from bus 1 150 over communication line 170 to bus 2 160. As voltage sensors 132 and 134 no longer detect a voltage on the line between source B 106 and UB 104 and bus 2 160, respectively, monitoring units 212 and 214 likewise cease detecting voltages. Accordingly, main 2 protection relay 102 and tie 2 protection relay 112 cease providing a Voltage Common Bus High signal over the common bus 380. However, main 1 protection relay 101 and tie 1 protection relay 111 continue to provide a Voltage Common Bus High signal and an Open Point at Bus 1 signal to the common bus 380. Tie 1 protection relay 111 continues to provide an Open Point is Ready to Close signal over common bus 380.

Main 2 protection relay 102 may detect the Voltage Common Bus High signal, indicating a portion of the power system has power, an Open Point at Bus 1 signal indicating that there is an open point (TB 113) in the power system 100, and an Open Point is Ready to Close signal indicating the open point (TB 113) can close. Based on these signals, main 2 protection relay 102 may trigger UB 104 to open.

Once UB 104 is open, as illustrated by the dashed lines in FIG. 5B, both tie 2 protection relay 112 and main 2 protection relay 102 may output an Open Point at Bus 2 signal on the common bus 380. Tie 2 protection relay 112 may determine UB 104 is open based on the Main Protection Relay Open signal sent by the main 2 protection relay 102 over paired line 332.

Both main 1 protection relay 101 and tie 1 protection relay 111 may detect the Open Point at Bus 2 signal on the common bus 380. Based on detecting the Open Point at Bus 2 signal, Open Point Ready to Close signal, and Voltage Common Bus High signal, main 1 protection relay 101, as the primary relay, may instruct TB 113 to close.

FIG. 5B illustrates the operating status of the power system 100 after TB 113 is closed. As illustrated, UB 103, TB 113, and TB 114 are closed and UB 104 is open (as illustrated by the dashed lines). Accordingly, power from source A 105 may be delivered to bus 1 150 and over connection line 170 to bus 2 160. Open UB 104 may prevent the power from source A from inadvertently traveling to source B 106. UB 104 also prevents power from source B, when power is restored, from inadvertently combining with the power from source A.

Figure 6A:
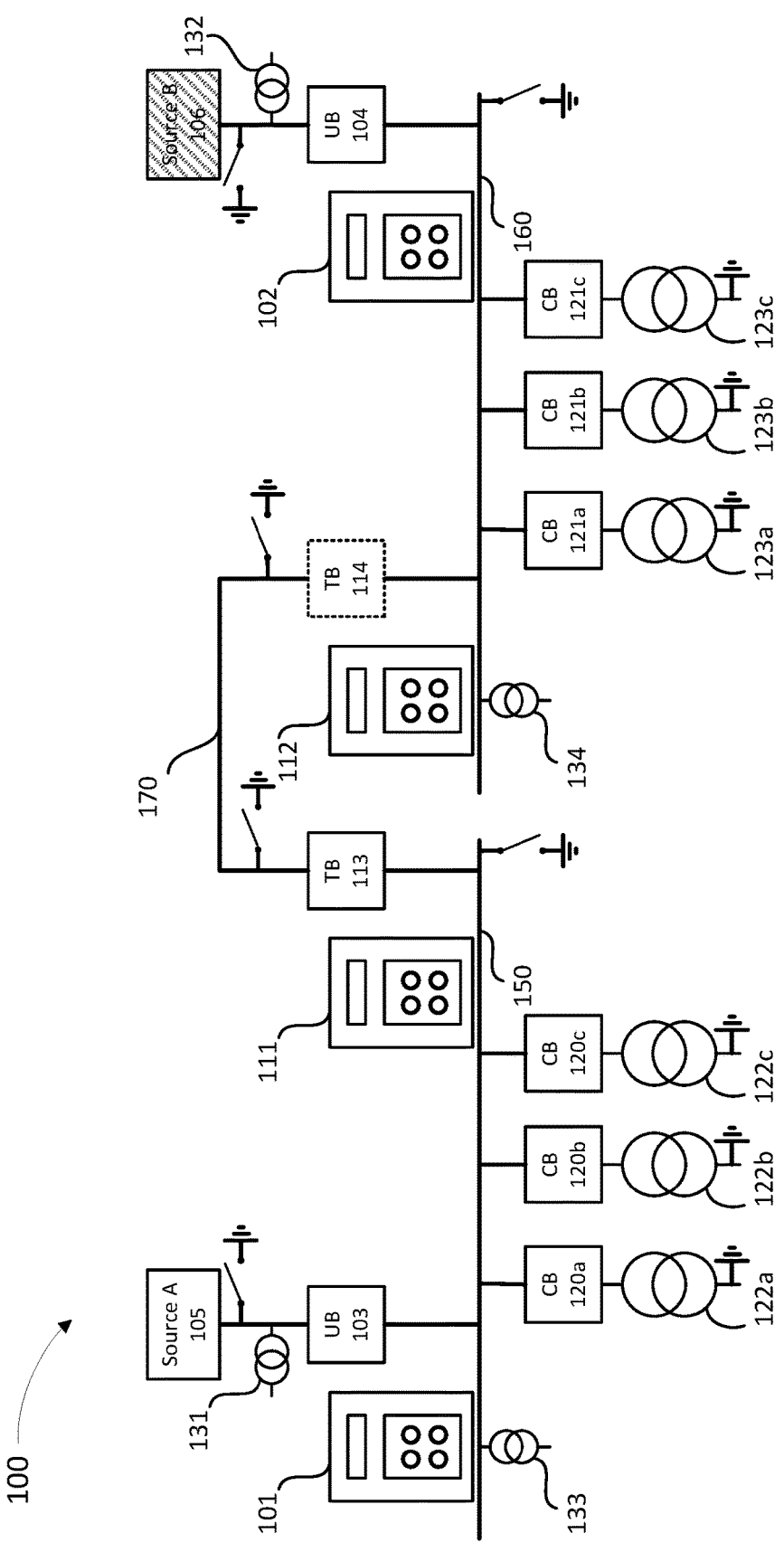
FIGS. 6A and 6B illustrates the operation of a power system, operating in a second typical operating scenario, when a single power source is unavailable, according to aspects of the disclosure.
Figure 6B:
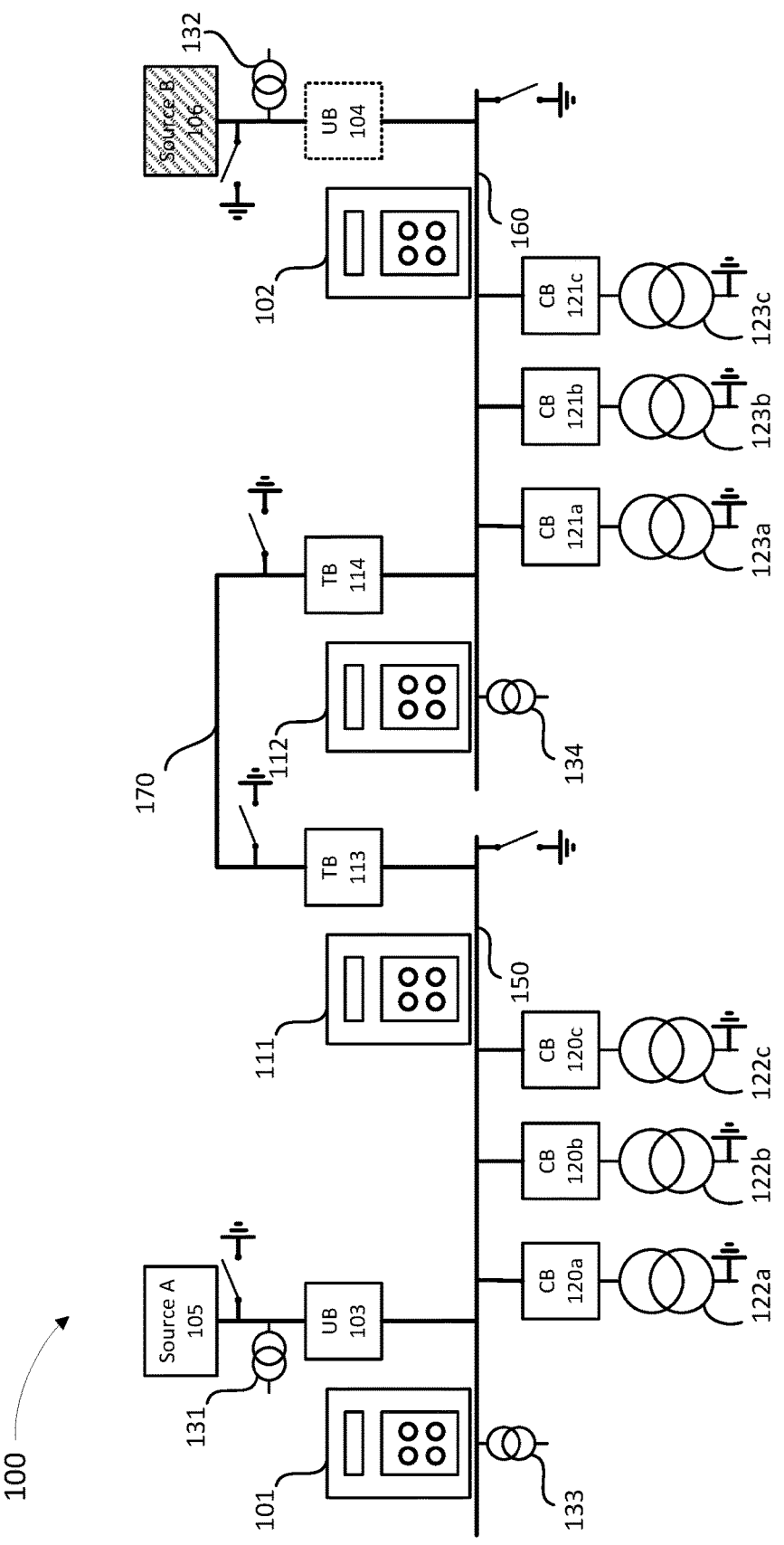

FIGS. 6A and 6B illustrates the operation of power system 100 in a second typical operation state (shown in FIG. 4B), when a single power source is unavailable and TB 114 is open. In the example shown in FIG. 6A, power system architecture 100 loses source B 106, such as by the power source B failing or a disconnection of the power system 100 from source B 106. The loss of source B 106 is illustrated by the shading of source B 106.

The loss of source B 106 results in power no longer being supplied to bus 2 160. This is because TB 114 is open, preventing power from source A 105 from being provided from flowing from bus 1 150 over communication line 170 to bus 2 160. As voltage sensors 132 and 134 no longer detect a voltage on the line between source B 106 and UB 104 and bus 2 160, respectively, monitoring units 212 and 214 likewise cease detecting voltages. Accordingly, main 2 protection relay 102 and tie 2 protection relay 112 cease providing a Voltage Common Bus High signal over the common bus 380, but continue to output and an Open Point at Bus 2 signal. Main 1 protection relay 101 and tie 1 protection relay 111 continue to provide a Voltage Common Bus High signal to the common bus 380. Tie 2 protection relay 112 continues to provide an Open Point is Ready to Close signal over common bus 380.

Main 2 protection relay 102 may detect the Voltage Common Bus High signal, indicating a portion of the power system has power, an Open Point at Bus 2 signal indicating that there is an open point (TB 114) in the power system 100, and an Open Point is Ready to Close signal indicating the open point (TB 114) can close. Based on these signals, main 2 protection relay 102 may trigger UB 104 to open.

Once UB 104 is open, as illustrated by the dashed lines in FIG. 6B, both tie 2 protection relay 112 and main 2 protection relay 102 may output an Open Point at Bus 2 signal on the common bus 380. Tie 2 protection relay 112 may determine UB 104 is open based on the Main Protection Relay Open signal sent by the main 2 protection relay 102 over paired line 332.

Next, tie 2 protection relay 112 detects the Open Point as the main 2 circuit breaker (UB 103) status is wired to Tie 2 protection relay 112. Main 2 Protection Relay 102 is healthy and it is the primary Relay that will first issue the close command to tie breaker 2 (TB 114). Main 2 protection relay 102 also sees Open Point Ready to Close Signal High and Voltage Common Bus Signal High. Main 2 protection relay 102 issues a command to close tie 2 breaker (TB 114) and power is restored to Bus 1 150.

FIG. 6B illustrates the operating status of the power system 100 after TB 114 is closed. As illustrated, UB 103, TB 113, and TB 114 are closed and UB 104 is open (as illustrated by the dashed lines). Accordingly, power from source A 105 may be delivered to bus 1 150 and over connection line 170 to bus 2 160. Open UB 104 may prevent the power from source A from inadvertently traveling to source B 106. UB 104 also prevents power from source B, when power is restored, from inadvertently combining with the power from source A.

Loss of Both Power Sources

Figure 7:
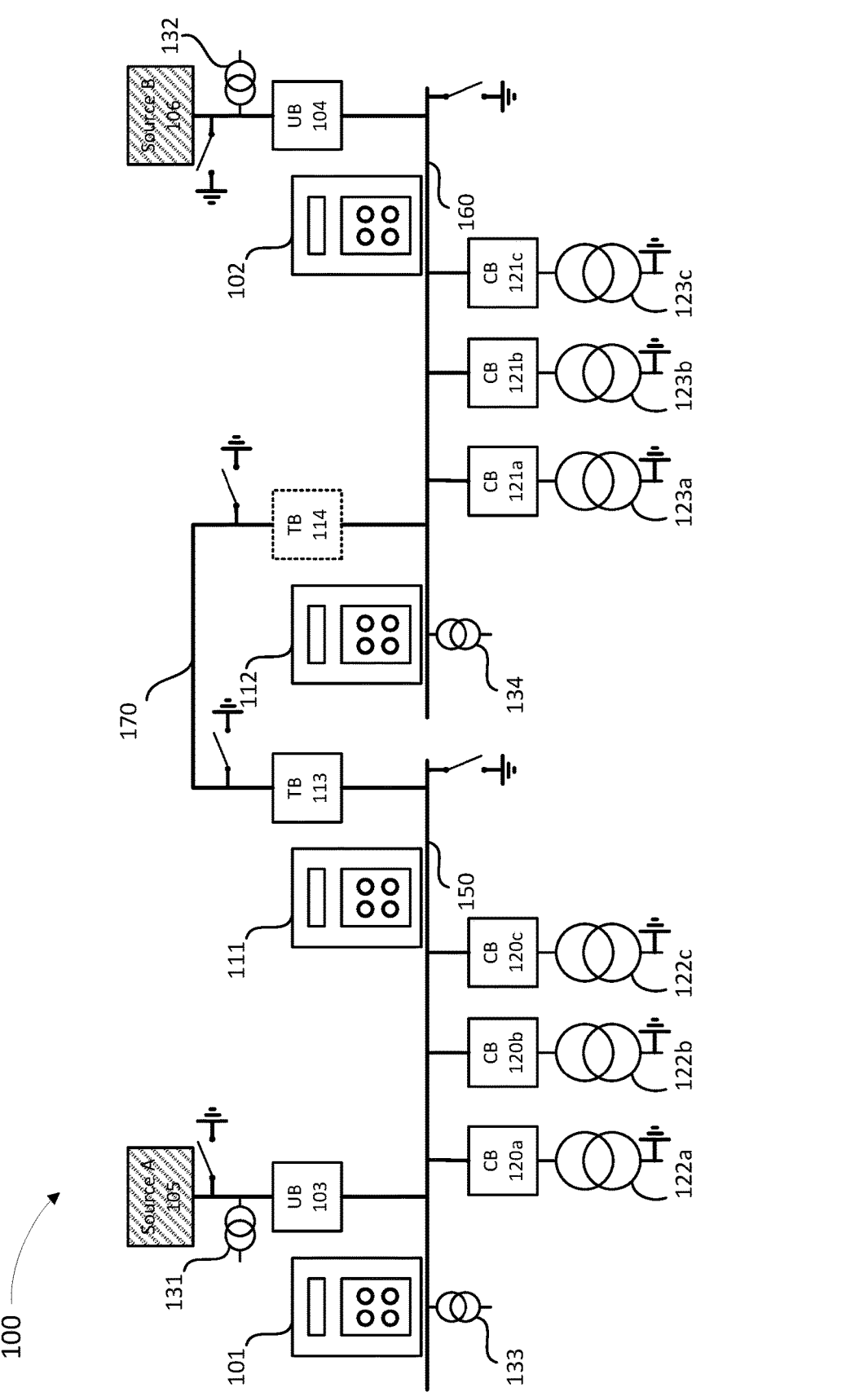
FIG. 7 illustrates the operation of a power system when two power sources are lost, according to aspects of the disclosure.

FIG. 7 illustrates the operation of power system 100 in a second typical operation state (shown in FIG. 4B) when power sources 105 and 106 are unavailable and TB 114 is open. In the example shown in FIG. 7, power system architecture 100 loses source A 105 and source B 106, such as by the power sources A and B failing or a disconnection of the power system 100 from source A 105 and source B 106. The loss of source A 105 is illustrated by the shading of source A 105. The loss of source B 106 is illustrated by the shading of source B 106. The loss of source A 105 and source B 106 results in power no longer being supplied to bus 1 150 or bus 2 160.

During the typical operation state, before the loss of power source A 105 and power source B 106, tie 2 protection relay 112 may output an Open Point Ready to Close signal to the common bus 380, as its associated breaker, TB 114, is capable of closing. Main 2 protection relay 102 and tie 2 protection relay 112 each output an Open Point at Bus 2 signal to the common bus 380, as the Open Point—TB 114—is on bus 2 160. Main 2 protection relay 102 is informed of the state of TB 114 by tie 2 protection relay 112. All relays may output a Voltage Common Bus High signal to the common bus 380, as each relay detects a voltage from its corresponding voltage sensor.

After power from source A 105 and source B is lost, main 2 protection relay and tie 2 protection relay may not contribute to Voltage Common Bus High Signal as their respective sensors 132, 134 no longer detect voltage (or detect an unhealthy voltage.) Similarly, main 1 protection relay and tie

1 protection relay may not contribute to Voltage Common Bus High Signal as their respective sensors 131, 133 no longer detect voltage (or detect an unhealthy voltage.)

Since the Voltage Common Bus High signal is not High (or does not otherwise indicate there is voltage on a power bus (e.g., bus 1 150 or bus 2 160)), the power system 100 will not create an Open Point or Close an Open Point as that will result in an unnecessary action. IN other words, taking an action such as opening or closing a breaker (e.g., UB 103, UB 104, TB 113, TB 114), would not restore power to bus 1 150 or bus 2 160. Accordingly, the state of the system will stay the same as before the power sources were lost.

Progressive Loss of Sources

Figure 8A:
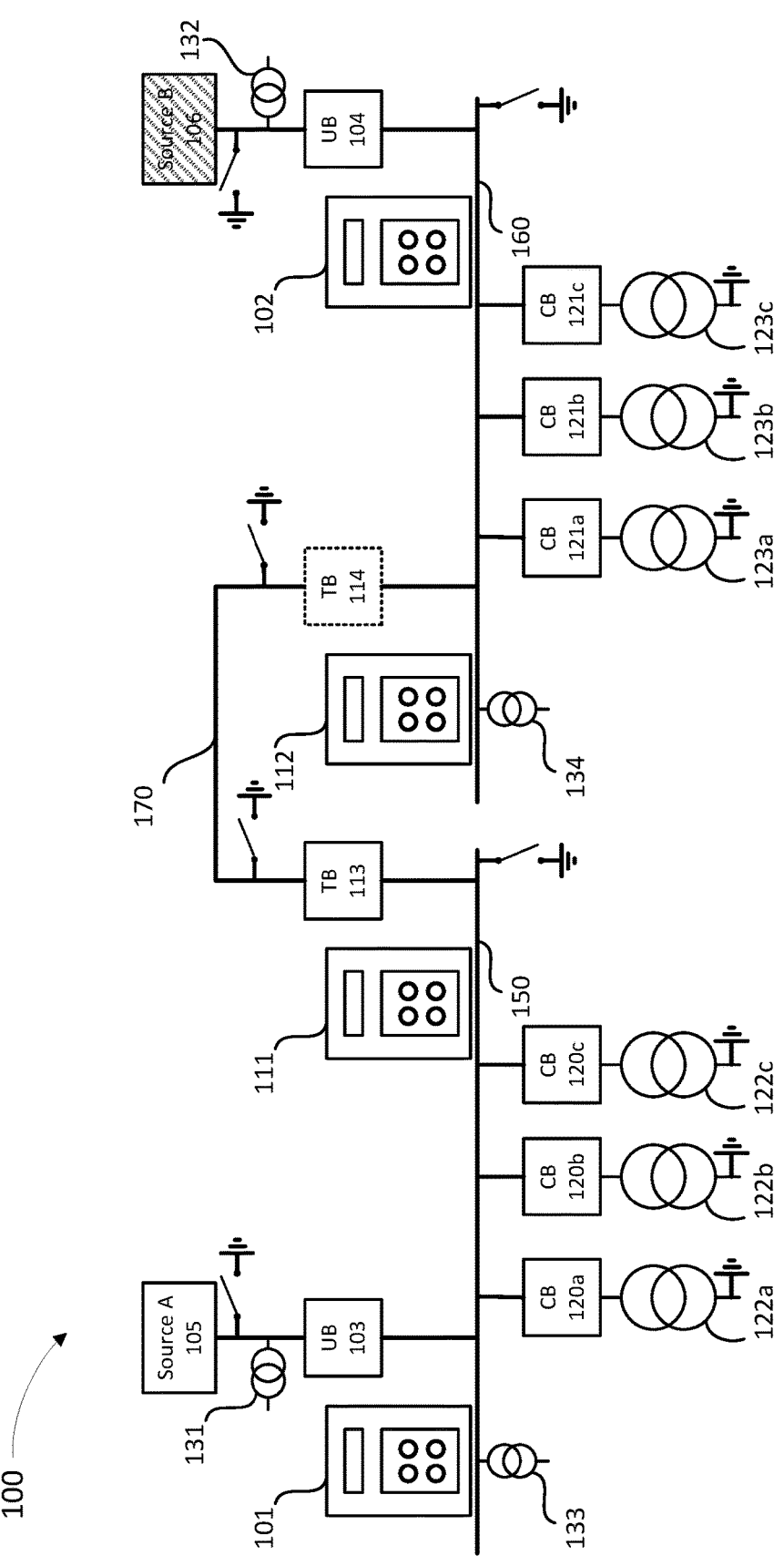
FIGS. 8A-8C illustrate the operation of a power system, operating in a second typical operating scenario, when power sources are lost sequentially, according to aspects of the disclosure.
Figure 8B:
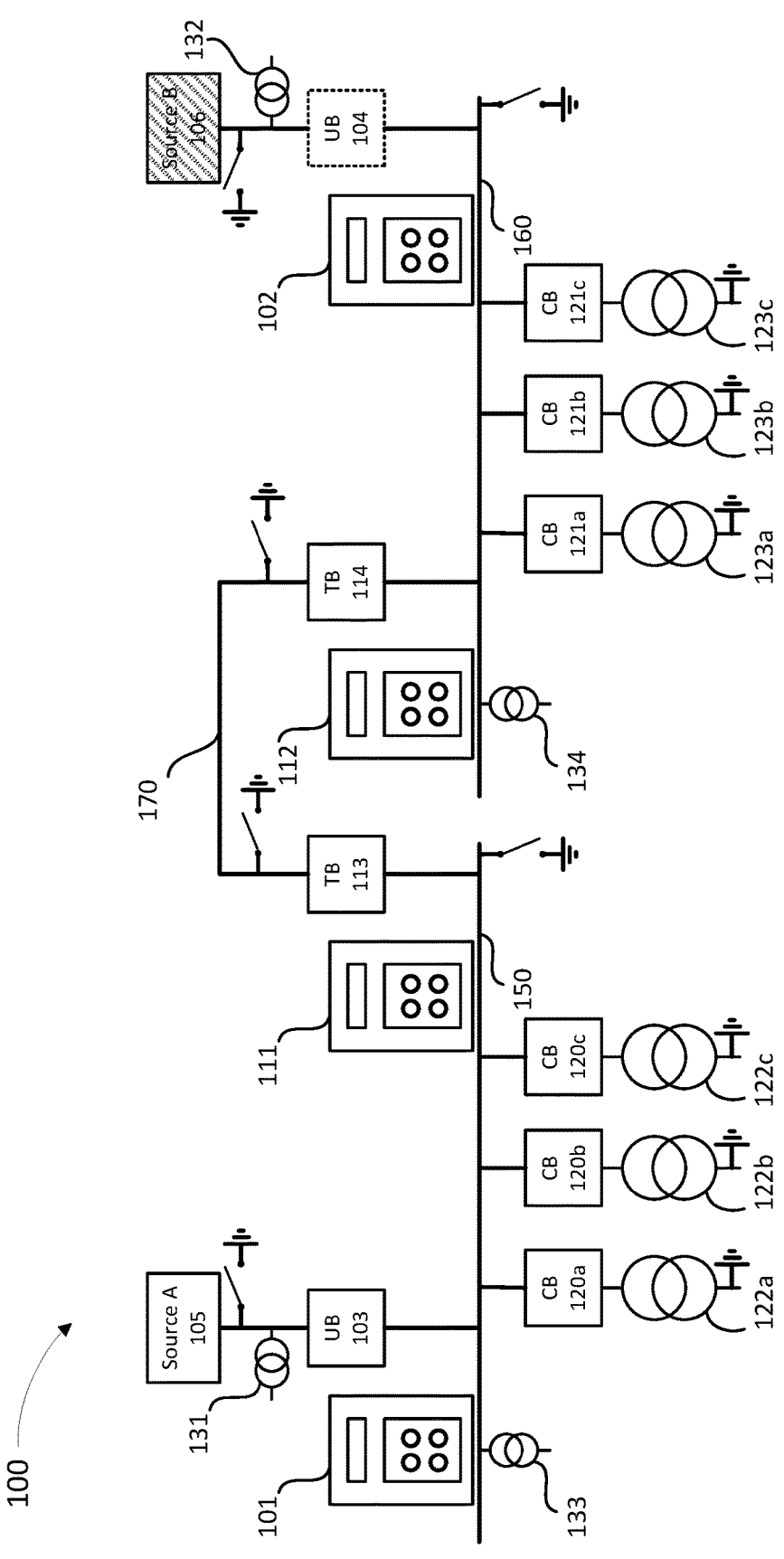
Figure 8C:
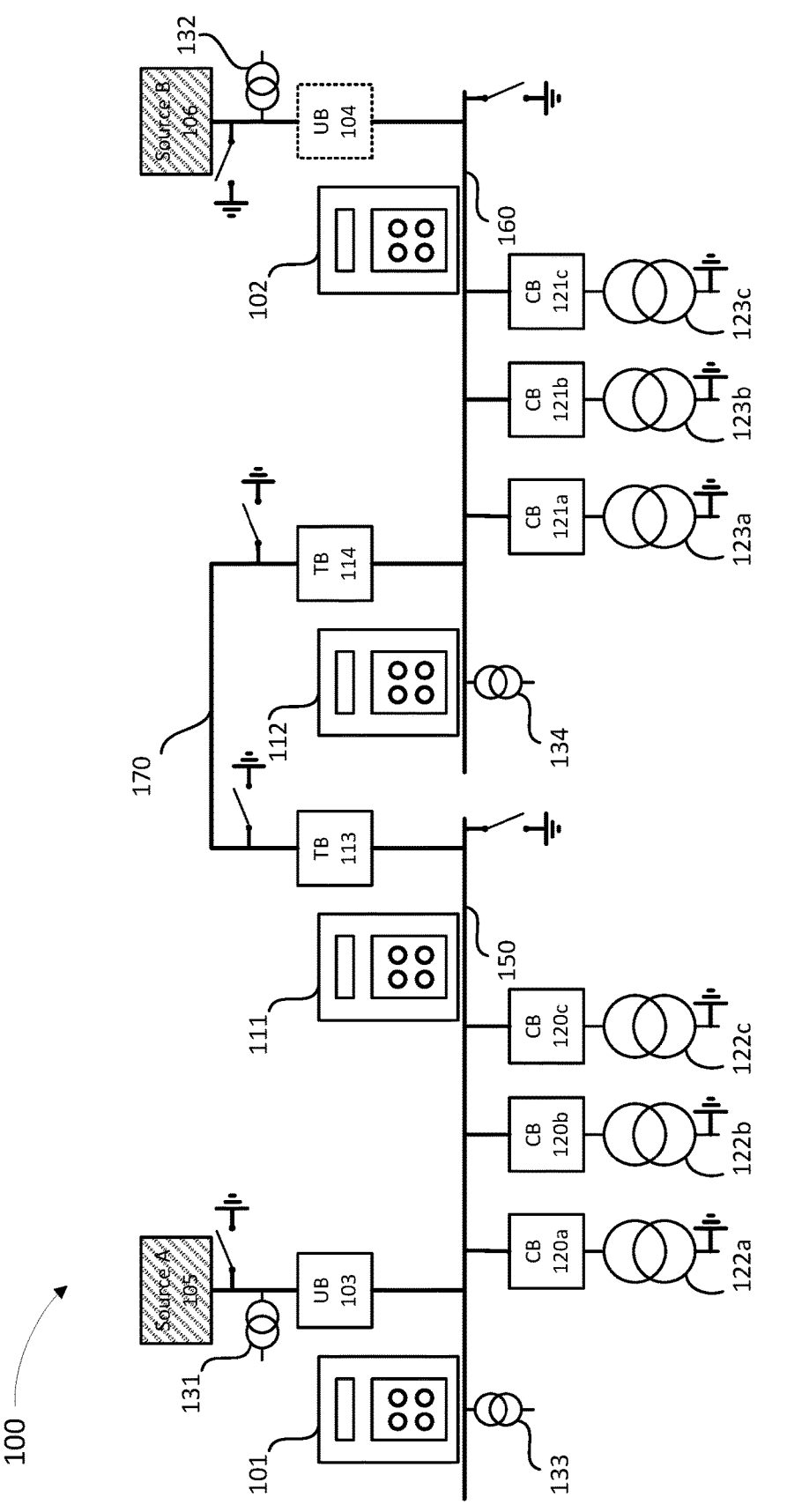

FIGS. 8A, 8B, and 8C illustrate the operation of power system 100 in a second typical operation state (shown in FIG. 4B), when power sources 105 and 106 become sequentially unavailable, and TB 114 is open. In particular, FIGS. 8A, 8B, and 8C illustrate the operation of power system 100 when source 106 becomes unavailable, and then power source 105 becomes unavailable. The loss of source A 105 is illustrated by the shading of source A 105. The loss of source B 106 is illustrated by the shading of source B 106.

The initial loss of source B 106 results in power no longer being supplied to bus 2 160. This is because TB 114 is open, preventing power from source A 105 from being provided from flowing from bus 1 150 over communication line 170 to bus 2 160. Upon the loss of source B 106, power system 100 will operate as described with reference to FIGS. 6A and 6B, with the power system 100 ending in the state illustrated by FIG. 8B, which is the same state as illustrated in FIG. 6.

However, after source A is lost, as illustrated in FIG. 8C, main 1 protection relay 101 and tie 1 protection relay 111 will also not contribute a Voltage Common Bus High signal as their respective sensors 131, 133 no longer detect a voltage (or detect an unhealthy voltage.) Since the Voltage Common Bus High signal is not High (or does not otherwise indicate there is voltage on a power bus (e.g., bus 1 150 or bus 2 160)), the power system 100 will not create an Open Point or Close an Open Point as that will result in an unnecessary action. In other words, taking an action such as opening a break (e.g., UB 103, TB 113, TB 114) or closing a breaker (e.g., UB 104), would not restore power to bus 1 150 or bus 2 160. Accordingly, the state of the system will stay the same as in FIG. 8B-before source A 105 was lost.

Auto Restoration

In instances where a single power is returned from a source that was not providing power or unclean power, the system may automatically return to a typical operations state, such as the first typical operating state shown in FIG. 4A or the second typical operating state shown in FIG. 4B. For instance, and referring to FIG. 6B, the power system 100 is not receiving power from source B 106. However, if power from source B is returned, the following operations may occur.

Main 2 protection relay 102 may see a healthy voltage via voltage sensor 132. Upon detecting the healthy voltage, main 2 protection relay 102 may wait a time period referred to as a "Voltage Healthy Time Delay." The Voltage Healthy Time Delay may be set to a time that ensures power delivery from source B 106 is stable, such as, for example, 1 minute, 5 minutes, 10 minutes, 1 hour, etc. Once the Voltage Healthy Time Delay is met (or bypassed), main 2 protection relay 102 may detect a High Voltage Common Bus Signal (internally) and also detect an Open Point Ready to Close Signal from UB 104. Thereafter, main 2 protection relay 102 may trigger TB 114 to open. Upon confirmation of TB 114 being opened, main protection relay 102 may issue a command to close UB 104. Once UB 104 is closed, the system is back to the second typical operating state, as illustrated in FIG. 4B.

Failure to Open/Close

In the event a breaker fails to open or close in response to commands issued by a primary relay, the secondary relay may provide a backup command. For instance, in the event TB 113 failed to close when main 1 protection relay 101 issued the command to close, tie 1 protection relay 111 may issue another command to TB 113 to close. In the event TB 113 does not close in response to any commands, no further actions may occur.

In some instances, a main protection relay may fail. Consider, for instance with reference to FIGS. 6A and 6B, main 2 protection relay 102 fails. Upon main 2 protection relay failure, tie 2 protection relay 134 becomes primary. Tie 2 protection relay 134 may provide an Open Point at Bus 2 signal indicating that bus 2 160 has an Open Point. Upon source B 106 being lost, main 2 protection relay 102 and tie 2 protection relay 112 will not contribute to Voltage Common Bus High Signal as main 2 protection relay 102 has failed and the voltage sensor 134 associated with tie 2 protection relay 112 does not sense a voltage or senses an unhealthy voltage. However main 1 protection relay 101 and tie 1 protection relay 111 still see healthy voltage via their respective sensors 131, 133. Main 1 Incomer VT and MV Bus A1 VT. Tie 2 protection relay 112 detect High Voltage Common Bus Signal and also it detects High Open Point Ready to Close Signal (internally). Therefore tie 2 protection relay proceeds to open UB 104. After tie 2 protection relay 112 opens UB 104, tie 2 protection relay may detect, via wiring 322, UB 104 is open. Tie 2 protection relay is healthy, and it is the primary relay and will issue the close command to TB 114. After the close command is sent to TB 114, TB 114 closes, restoring power to bus 2 160.

In some instances, a relay may provide a "Transfer in Progress" signal to the common bus 380 before instructing a breaker to take an action. Detection of the Transfer in Progress signal by a secondary relay may start a timer before the secondary relay issues a backup command. For instance, before main 1 protection relay 101 issued the command to close TB 113, main 1 protection relay 101 may have output a Transfer in Progress signal to the common bus 380. Tie 1 protection relay 111 may detect the signal and begin a timer. If TB 113 has not closed before the timer reaches a pre-defined amount of time, tie 1 protection relay 111 may issue a backup command to TB 113 instructing it to close.

Although the technology herein has been described with reference to particular examples, it is to be understood that these examples are merely illustrative of the principles and applications of the Present technology. It is, therefore, to be understood that numerous modifications may be made to the illustrative examples and that other arrangements may be devised without departing from the spirit and scope of the present technology as defined by the appended claims. For instance, although the example operations are shown using certain components of the power system architectures it should be understood similar operations may be performed by similar components of the power system architectures.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A main-tie-tie-main (MTTM) power system comprising:
   a first main protection relay controlling a first utility breaker;
   a second main protection relay controlling a second utility breaker;
   a first tie protection relay controlling a first tie breaker;
   a second tie protection relay controlling a second tie breaker; and
   a common bus communicatively connecting the first main protection relay, second main protection relay, first tie protection relay, and second tie protection relay together, wherein each of the first main protection relay, second main protection relay, first tie protection relay, and second tie protection relay is connected to the common bus via one or more communication lines,
   wherein the first main protection relay and the first tie protection relay are connected together via a first paired line, and
   wherein the first main protection relay controls the first tie breaker via the first paired line and the first tie protection relay controls the first utility breaker via the first paired line.

2. The power system of claim 1, wherein the first utility breaker is connected to a first power source and the second utility breaker is connected to a second power source.

3. The power system of claim 2, wherein the first utility breaker is further connected to a first bus and the second utility breaker is further connected to a second bus.

4. The power system of claim 3, wherein the first tie protection relay is connected to the first tie breaker and a first voltage sensing device monitoring a voltage of the first bus, and the second tie protection relay is connected to the second tie breaker and a second voltage sensing device monitoring a voltage of the second bus.

5. The power system of claim 4, further comprising:
   a first voltage sensor configured to detect a voltage provided by the first power source to the first utility breaker;
   a second voltage sensor configured to detect a voltage provided by the second power source to the second utility breaker;
   a third voltage sensor configured to detect a voltage on the first bus; and
   a fourth voltage sensor configured to detect a voltage on the second bus.

6. The power system of claim 5, wherein the first voltage sensor is configured to provide the detected voltage provided by the first power source to the first main protection relay, the second voltage sensor is configured to provide the detected voltage provided by the second power source to the second main protection relay, the third voltage sensor is configured to provide the detected voltage on the first bus to the first tie protection relay, and the fourth voltage sensor is configured to provide the voltage detected on the second bus to the second tie protection relay.

7. The power system of claim 3, wherein one or more loads are connected to the first and/or second bus.

8. The power system of claim 1, wherein a connection line connects the first bus and the second bus.

9. The power system of claim 1, wherein the first main protection relay and the first tie protection form a first relay pair and the second main protection relay and the second tie protection relay form a second relay pair.

10. The power system of claim 9, wherein the second main protection relay and the second tie protection relay are connected together via a second paired line.

11. The power system of claim 10, wherein the second main protection relay controls the second tie breaker via the second paired line and the second tie protection relay controls the second utility breaker via the second paired line.

\* \* \* \* \*